United States Patent
MacKinnon et al.

[11] 3,721,389
[45] March 20, 1973

[54] EXIT NOZZLE ASSEMBLIES FOR GAS TURBINE POWER PLANTS

[75] Inventors: Malcolm Iain K. MacKinnon, Seattle; Bjarne E. Syltebo, Bellevue, both of Wash.

[73] Assignee: The Boeing Company, Seattle, Wash.

[22] Filed: June 10, 1971

[21] Appl. No.: 151,816

[52] U.S. Cl. ........................239/265.19, 181/33 HD
[51] Int. Cl. ..............................................B64d 33/04
[58] Field of Search.........239/127.1, 265.19, 265.25, 239/265.27; 181/33 HC, 33 HD

[56] References Cited

UNITED STATES PATENTS

| | | | |
|---|---|---|---|
| 3,598,318 | 8/1971 | Schiel | 239/265.19 X |
| 3,533,486 | 10/1970 | Paulson | 181/33 HD |
| 3,261,164 | 7/1966 | Tumicki | 239/265.25 X |
| 3,187,835 | 6/1965 | Smith | 181/33 HD |
| 3,303,653 | 2/1967 | Hull, Jr. | 239/265.27 X |

*Primary Examiner*—M. Henson Wood, Jr.
*Assistant Examiner*—Reinhold W. Thieme
*Attorney*—Brown, Murray, Flick & Peckham

[57] ABSTRACT

A nozzle assembly for gas turbine power plants, particularly aircraft jet engines, which incorporates a generally annular splitter dividing the nozzle into two parts and provided on its surface with suitable sound-absorbing material. Incorporated into the splitter and forming a part thereof is apparatus for varying the cross-sectional area of the nozzle exit and, hence, the operating characteristics of the power plant. This latter means preferably comprises a plurality of arcuate segments hinged to the splitter and actuable from a position where they are flush with the remainder of the splitter surface to extended positions where they effectively reduce the nozzle cross-sectional area. The assembly, therefore, performs two functions. First, it provides additional sound-absorbing area; and, secondly, it acts as a nozzle area control device.

8 Claims, 7 Drawing Figures

PATENTED MAR 20 1973 3,721,389

INVENTORS.
MALCOLM IAN K. MacKINNON &
BJARNE E. SYLTEBO
By
Brown, Murray, Flick & Peckham
Attorneys

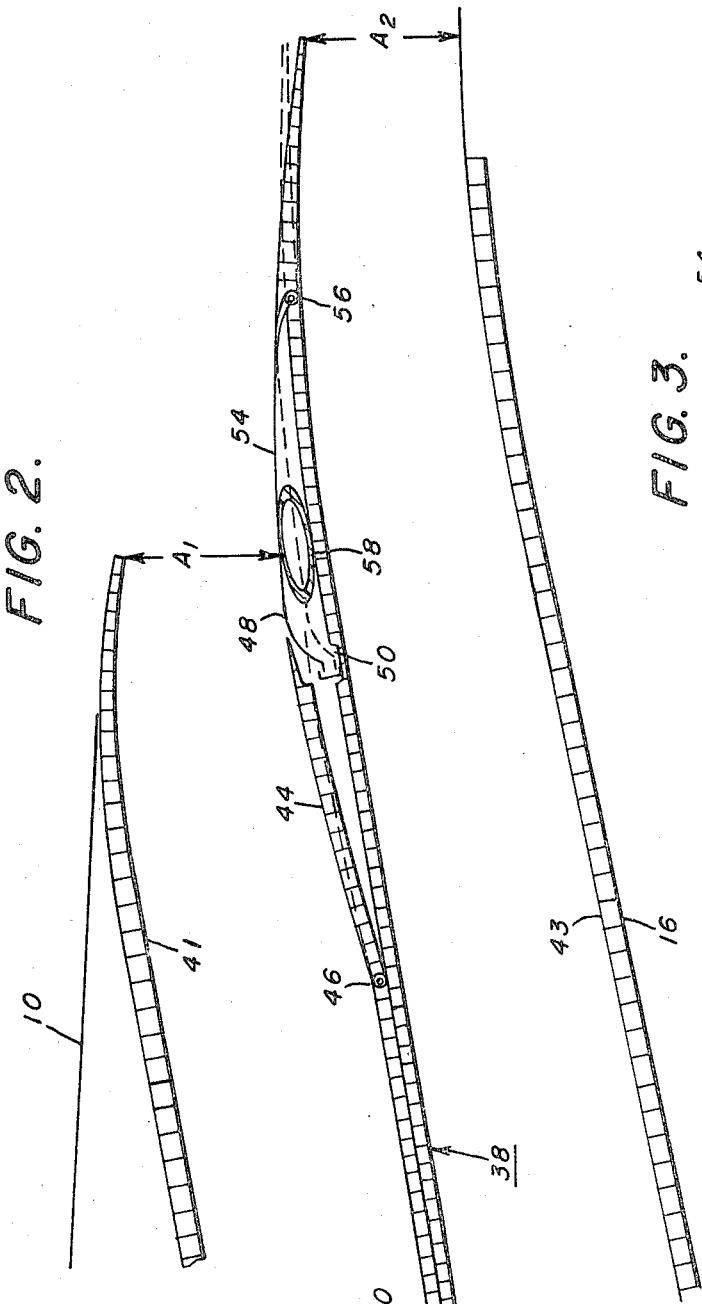
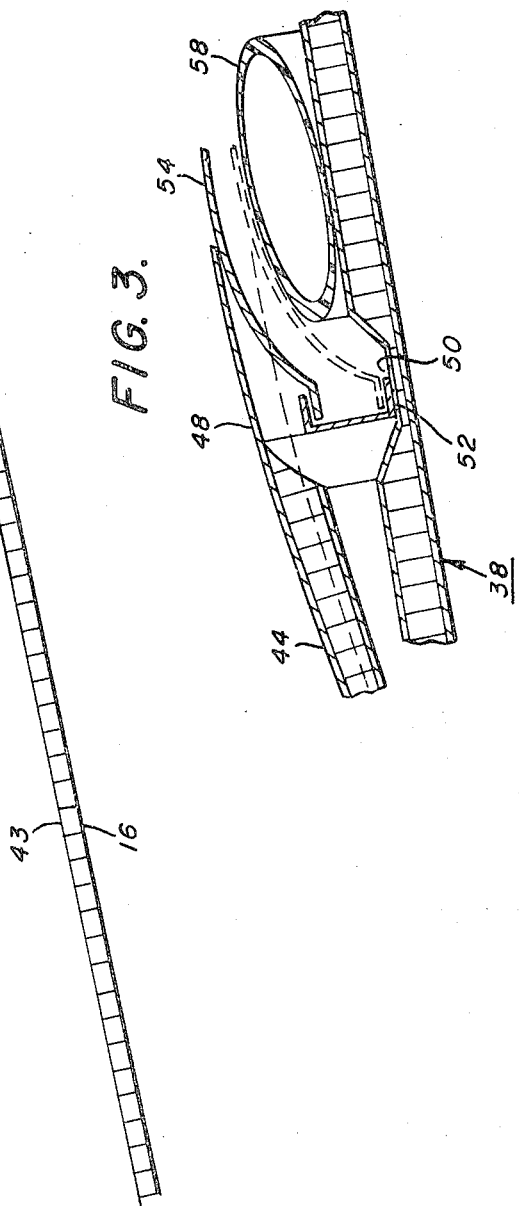
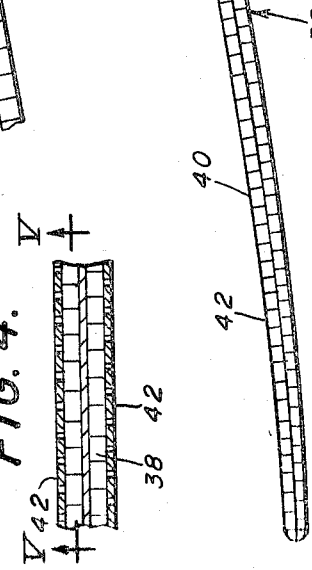
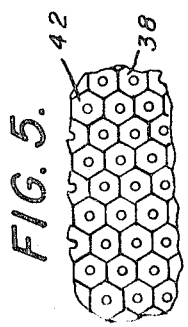

EXIT NOZZLE ASSEMBLIES FOR GAS TURBINE POWER PLANTS

BACKGROUND OF THE INVENTION

In the usual case, a gas turbine jet engine comprises a compressor, a combustion chamber receiving compressed air from the compressor, a gas turbine receiving the air and gases of combustion from the chamber and serving to drive the compressor, and a nozzle (usually an annular nozzle) for discharging the turbine exhaust in the form of a reactive propulsive jet. Certain types of jet engines, commonly called fan-jets or turbofans, are provided with a forward duct-enclosed, axial-flow fan whose rotating blades and stationary vanes are considerably larger but otherwise similar to the blades and vanes of the compressor for the gas turbine. Part of the air flow produced by this forward fan is bypassed through an annular nozzle to the atmosphere; while the remainder passes through the basic engine. Thus, the fan makes a substantial contribution to the total thrust.

Over and above the thrust produced by the basic engine, the fan accelerates the air passing through it and forces it through the aforesaid secondary annular nozzle to generate thrust of its own in the manner of the propeller of a turbo-prop engine. That is, the fan air is exhausted through the secondary nozzle without passing through the engine and is not burned with fuel or used for internal engine cooling.

In order to reduce the noise produced by jet engines of this type, it has been proposed to provide sound-absorbing material on the inner and outer walls forming either the rear exhaust nozzle or the forward secondary bypass nozzle through which compressed air from the forward fan passes. At the same time, it is necessary to provide a means whereby the cross-sectional area of the nozzle can be varied. In this respect, the power and efficiency of the turbine is dependent to a large degree upon the back pressure imposed on the turbine or the forward fan by the nozzles. Accordingly, variations in the effective areas of the primary and secondary nozzles govern the speed of operation of the gas turbine and optimize its performance in terms of power and efficiency throughout its operating range.

SUMMARY OF THE INVENTION

In accordance with the present invention, there is provided, in a gas turbine exhaust nozzle, the combination of an annular splitter assembly disposed in the annular space defined between inner and outer coaxial walls and provided with sound-absorbing means on the surfaces thereof. This splitter, disposed within the normal nozzle exit orifice, provides additional sound-absorbing surface area. At the same time, means are incorporated into the splitter for varying the effective cross-sectional area of the nozzle exit. Thus, the splitter serves both the purpose of providing additional sound-absorbing area and at the same time acts as a means for controlling the nozzle exit area.

In the past, it has been common to vary nozzle exit area by means of multi-petal or cowl-flap arrangements. This, however, increases the weight of the power plant, results in aerodynamic drag losses at cruise speeds with the nozzle at minimum area, and is incompatible with maximizing the length of an acoustic splitter and, consequently, maximizing sound absorption.

By following the teachings of the invention and by incorporating means for varying nozzle exit area into the splitter itself, a fixed-wall pressure vessel is realized. Additionally, the variable area nozzle design of the invention permits scheduled fan area variation between the inner and outer annular walls of a bypass nozzle. This design feature permits optimum splitter aerodynamics controlling the stagnation streamline within an acceptable leading edge splitter position regardless of nozzle area positioning.

The above and other objects and features of the invention will become apparent from the following detailed description taken in connection with the accompanying drawings which form a part of this specification, and in which:

FIG. 2 is an elevational cross-sectional view of one embodiment of the invention incorporating a pneumatic boot within an annular splitter for the purpose of actuating arcuate nozzle flap segments to vary the cross-sectional area of the nozzle exit orifice;

FIG. 3 is an enlarged cross-sectional view of the pneumatic boot actuation system of the invention;

FIG. 4 is a cross-sectional view of the honeycomb structure forming the sound-absorbing lining of the invention;

FIG. 5 is a cross-sectional view taken substantially along line V—V of FIG. 4;

Figure 1:
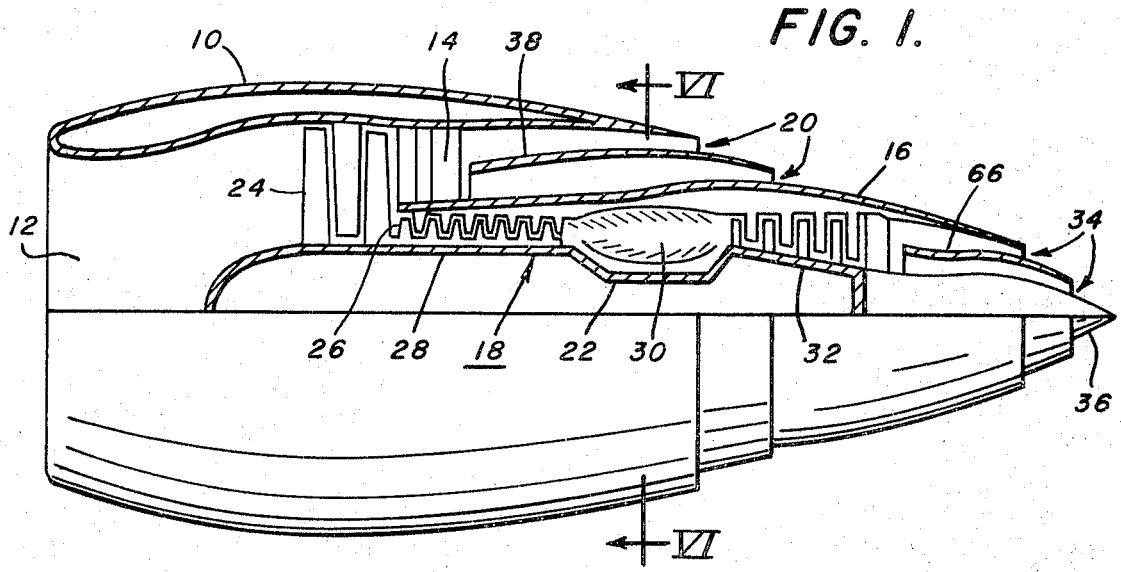
FIG. 1 is a schematic diagram of one type of aircraft gas turbine power plant with which the splitter of the invention may be used.

With reference now to the drawings, and particularly to FIG. 1, there is shown a typical aircraft gas turbine power plant of the turbo-fan type which includes a forward annular cowling 10 providing a forward opening 12 into which air passes. The cowling 10, in turn, is mounted on prods 14 disposed around the skin 16 of the gas turbine power plane proper, generally indicated by the reference numeral 18. Between the inner periphery of the cowling 10 and the outer periphery of the skin 16 is an annular bypass nozzle 20.

The power plant itself comprises a turbine shaft 22 which carries, at its forward end, a fan 24 comprised of interleaved rotor and stator blades, as is conventional. When the turbine shaft 22 is rotating, the fan 24 imparts energy to the incoming stream of air, part of which passes through the bypass nozzle 20 and the remainder of which enters the intake end 26 of the power plant 18.

The power plant 18 includes a compressor section 28, a combustion chamber section 30, a turbine section 32 and an exit nozzle section 34. As was explained above, the portion of the air from fan 24 which enters the intake end 26 enters the compressor section 28 wherein it is compressed by interleaved stator and rotor blades. The compressed air then enters the combustion chamber section 30 where it is combined with a fuel which is burned, the products of combustion passing through the turbine 32, comprising interleaved stator and rotor blades, and thence through the exit nozzle 34. By virtue of an exhaust cone 36, the nozzle 34 is generally annular in configuration, similar to the annular bypass nozzle 20.

In operation, the fan 24 precompresses the incoming air before it enters the main turbine compressor section 28. Part of this precompressed air is bypassed through the bypass nozzle 20. This bypassed air, in the form of a high velocity annular jet, adds to the thrust produced at the exit nozzle of the turbine itself. The remainder of the precompressed air enters the inlet end 26 of the turbine and is compressed, passes through the combustion chamber section 30, and finally exits through the turbine section 32 and the nozzle 34. The power and efficiency of the turbine are dependent upon the back pressure imposed on the turbine by the nozzles 20 and 34. Accordingly, it becomes necessary to provide means for varying these nozzle areas. At the same time, in order to suppress noise, it is desirable to provide some type of sound-absorbing means in the nozzles 20 and 34.

In accordance with the present invention, sound suppression in the nozzle area 20, for example, is provided by means of an annular splitter assembly 38 disposed within the nozzle. In this respect, both the outer and inner surfaces of the annular splitter 38 are provided with sound-absorbing material, as well as the inner periphery of the cowling 10 and the outer periphery of the skin 16 in the area of nozzle 20. This is perhaps best shown in FIG. 2. On opposite sides of the splitter 38 are honeycomb structures 40 covered with perforated plates 42. (See also FIGS. 4 and 5). The same type of honeycomb-perforated plate structure is provided on the inner periphery of the cowling 10 and the outer periphery of the skin 16, as at 41 and 43. Sound vibrations enter the perforations 42 and pass into the cavities formed by the honeycomb structure 40 where they are dissipated or absorbed in a muffler action.

Incorporated into the splitter 38 are arcuate ramp sections 44, one of which is shown in FIG. 2. The ramp sections 44 are hinged or pivotally connected to the remainder of the splitter 38 as at 46 such that they may move from a position where they are essentially flush with the remainder of the splitter to an extended position where they reduce the cross-sectional area of the nozzle orifice.

As best shown in FIG. 3, tapered portions 48 on the ramp sections 44 overlie recessed portions 50 in the interior of the splitter 38. The recessed portion 50, in turn, receives the forward end 52 of an arcuate flap 54 (see also FIG. 2) hinged to the remainder of the splitter 38 as at 56. Beneath the arcuate flaps 54 is a continuous, annular pneumatic boot 58 which, when the assembly is incorporated into an exhaust nozzle, must be formed from some heat resistant, flexible material. With the arrangement shown, it will be appreciated that when the boot 58 is deflated, the ramps 44 and flaps 54 will be flush, or almost flush, with the remainder of the outer surface of the splitter 38. However, when the boot 58 becomes inflated, the ramps 44 and flaps 54 are pivoted outwardly about pivot points 46 and 56, respectively; and in this process the cross-sectional area, defined by the radial distance $A_1$, is reduced. This, of course, increases the back pressure produced by the nozzle, the amount of the back pressure being dependent upon the extent to which the boot 58 is inflated. It should be understood, however, that instead of using a boot as shown herein, other types of devices, such as mechanical linkages, can be used to move the flaps 54 inwardly or outwardly as well as the ramps 44. Normally, the boot 58 will be inflated to reduce the cross-sectional area of the nozzle during cruise conditions; while the flaps will be deflated to increase the nozzle area during take-off when maximum thrust is desired.

Of course, maximum acoustic treatment and absorption of sound can be achieved by maximizing the length of the splitter 38. This can be achieved in the present invention by virtue of the fact that the nozzle area varying device is built into the splitter itself rather than being a separate petal or other device which requires additional, bulky actuating means. In this respect, acoustical optimization of the nozzle is governed in part by the relationships between the duct cross sections (controlled by the areas defined by dimensions $A_1$ and $A_2$), the total acoustically treated surface area, and the duct length. In the embodiment of FIGS. 2 and 3, there are two ducts each defined by the space between the skin 16 and the splitter 38 or the splitter 38 and the inner periphery of cowling 10. In order to maximize the acoustic characteristics of the assembly and to reduce noise, the ratio of the height or width of each duct (i.e., dimension $A_1$ and $A_2$) to the length of the duct should be the same. This means that in the embodiment shown in FIG. 2, for example, the dimension $A_1$ should be less than the dimension $A_2$ since the length of the inner duct is greater than that of the outer duct.

Figure 6:
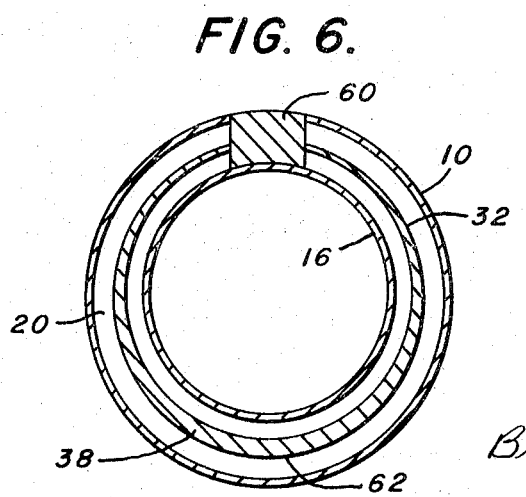
FIG. 6 is a cross-sectional view taken substantially along line VI—VI of FIG. 1.

With reference now to FIG. 6, it can be seen that the power plant will be suspended from the aircraft wing or other part of the fuselage by means of a strut 60 which divides or bifurcates the exit nozzle 20 into two parts. As a result, a pressure bump or distortion in pressure is imposed on the rotating fan. In order to compensate for this, the circumferential splitter 38 is of varying thickness and/or varying camber to compensate for this blockage. Thus, in FIG. 6, the thickness of the splitter 38 is greater at the side 62 opposite the strut 60 and gradually tapers downwardly in cross section up to the strut 60.

Figure 7:
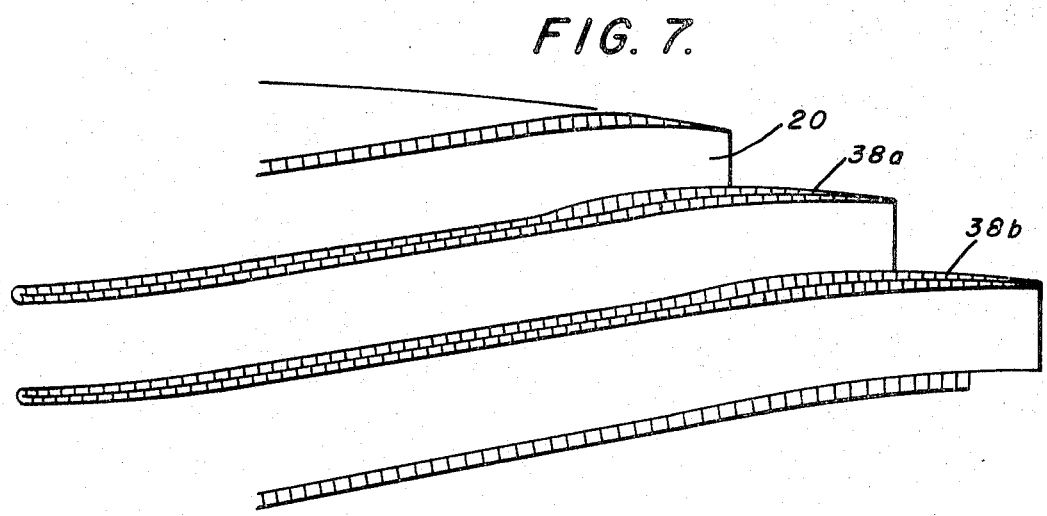
FIG. 7 is a schematic illustration of another embodiment of the invention wherein multiple splitters are employed.

In FIG. 7, another embodiment of the invention is shown which is similar to that already described except that in this case there are two annular splitters 38A and 38B disposed within the nozzle area 20. This, of course, provides still greater sound-absorbing surface within the nozzle section.

While the foregoing description has been limited to the use of a splitter incorporating a nozzle area varying device within the bypass nozzle 20 of FIG. 1, it should be understood that it is also possible to provide such a splitter, such as splitter 66 shown in FIG. 1, in the exit nozzle 34. In this latter case, of course, care must be taken to provide a pneumatic boot actuating device or other similar arrangement which will withstand the heat of the exhaust gases. Aside from this, however, the operation of the splitter and the exhaust nozzle is the same as that described above in connection with a bypass nozzle.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a gas turbine power plant having an exhaust nozzle defined by inner and outer essentially annular coaxial walls which form an annular space through which a high velocity gas stream passes and which terminates at a nozzle exit, the combination of an annular splitter assembly disposed in said annular space between said walls and provided with sound-absorbing means on the surfaces thereof, and resilient means incorporated internally into said splitter for expanding its cross-sectional area to thereby vary the effective cross-sectional area of said nozzle exit.

2. The combination of claim 1 wherein said annular splitter assembly divides said nozzle exit into two ducts, the ratio of the width of one duct to its length being equal to the ratio of the width of the other duct to its length to obtain acoustical balance between the two ducts.

3. The combination of claim 1 wherein said sound-absorbing means comprises honeycomb structures covered with perforated plates.

4. The combination of claim 1 wherein said means for varying the effective cross-sectional area of said nozzle exit comprises flap means movable from a position where it is essentially flush with the remainder of the surface of said splitter to a position where it extends into the nozzle to reduce its cross-sectional area.

5. The combination of claim 4 wherein said flap means is moved by means of an inflatable annular boot.

6. The combination of claim 1 wherein said means for varying the effective cross-sectional area of said nozzle exit comprises a plurality of arcuate ramps pivotally connected at their forward ends to said splitter and having free trailing ends, and a plurality of arcuate flaps pivotally connected at their trailing ends to said splitter and having their forward ends disposed beneath the trailing ends of said arcuate ramps, the arrangement being such that when said flaps are forced radially outwardly about their pivotal connection to the splitter the ramps will be forced radially outwardly about their pivotal connection to the splitter also, thereby reducing the cross-sectional area of said nozzle.

7. The combination of claim 1 wherein said power plant is suspended from an aircraft by a strut which passes through said annular space defining the exhaust nozzle, the splitter assembly being of tapered cross-sectional area to compensate for the pressure bump produced by said strut.

8. The combination of claim 7 wherein the cross-sectional area of said splitter assembly is greatest diametrically opposite said strut and reduces on opposite sides of the strut as it approaches the strut.

* * * * *